(12) United States Patent
Fulton

(10) Patent No.: US 9,162,634 B2
(45) Date of Patent: Oct. 20, 2015

(54) RETAINING CLIP AND BRACKET FOR ROOF MOLDING

(71) Applicant: Honda Motor Co., Ltd., Tokyo (JP)

(72) Inventor: Benjamin Fulton, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/208,333

(22) Filed: Mar. 13, 2014

(65) Prior Publication Data
US 2014/0265455 A1 Sep. 18, 2014

Related U.S. Application Data

(60) Provisional application No. 61/779,681, filed on Mar. 13, 2013.

(51) Int. Cl.
*B60R 13/04* (2006.01)
*F16B 5/12* (2006.01)

(52) U.S. Cl.
CPC ............... *B60R 13/04* (2013.01); *F16B 5/128* (2013.01); *Y10T 24/30* (2015.01); *Y10T 29/49959* (2015.01)

(58) Field of Classification Search
CPC ..... Y10T 24/303; Y10T 24/309; Y10T 24/30; Y10T 24/302; Y10T 24/307; Y10T 24/44026; Y10T 428/24008; Y10T 428/24017; B60R 13/04; B60R 13/0206
USPC ........... 296/210, 213; 52/716.2, 716.6, 716.5, 52/717.7; 24/457, 297, 293, 628
See application file for complete search history.

(56) References Cited

U.S. PATENT DOCUMENTS

| | | | |
|---|---|---|---|
| 3,673,643 A | 7/1972 | Kindell | |
| 4,838,004 A | 6/1989 | Adell | |
| 5,013,083 A * | 5/1991 | Yada et al. | 296/213 |
| 5,202,172 A | 4/1993 | Graf | |
| 5,829,825 A * | 11/1998 | Kim | 296/210 |
| 6,564,433 B2 | 5/2003 | Nagasawa | |
| 7,407,224 B2 * | 8/2008 | Okabe et al. | 296/210 |
| 7,681,412 B1 * | 3/2010 | Arroyo et al. | 62/457.7 |
| 7,695,038 B2 * | 4/2010 | Harberts et al. | 296/1.08 |
| 8,020,354 B2 | 9/2011 | Scroggie et al. | |
| 8,070,204 B2 * | 12/2011 | Mourou | 296/1.08 |
| 2012/0068488 A1 | 3/2012 | Mourou | |

* cited by examiner

*Primary Examiner* — Glenn Dayoan
*Assistant Examiner* — Sunsurraye Westbrook
(74) *Attorney, Agent, or Firm* — Rankin, Hill & Clark LLP

(57) ABSTRACT

A molding fixing assembly for securing a roof molding in a roof groove includes a bracket fixedly secured in the roof groove and a separate clip mounted to the molding. The bracket includes a base and a pair of arms extending substantially perpendicularly from opposed longitudinal side edges of the base. At least one of the arms includes a first retaining member and a second retaining member having a configuration different than the first retaining member. The clip includes a body having a pair of longitudinal sidewalls and a pair of end walls. At least one of the sidewalls has a post projecting therefrom. To connect the clip to the bracket, the sidewalls of the clip are positioned between the pair of arms of the bracket. The first retaining member engages one of the sidewalls of the clip and the second retaining member engages the post.

2 Claims, 5 Drawing Sheets

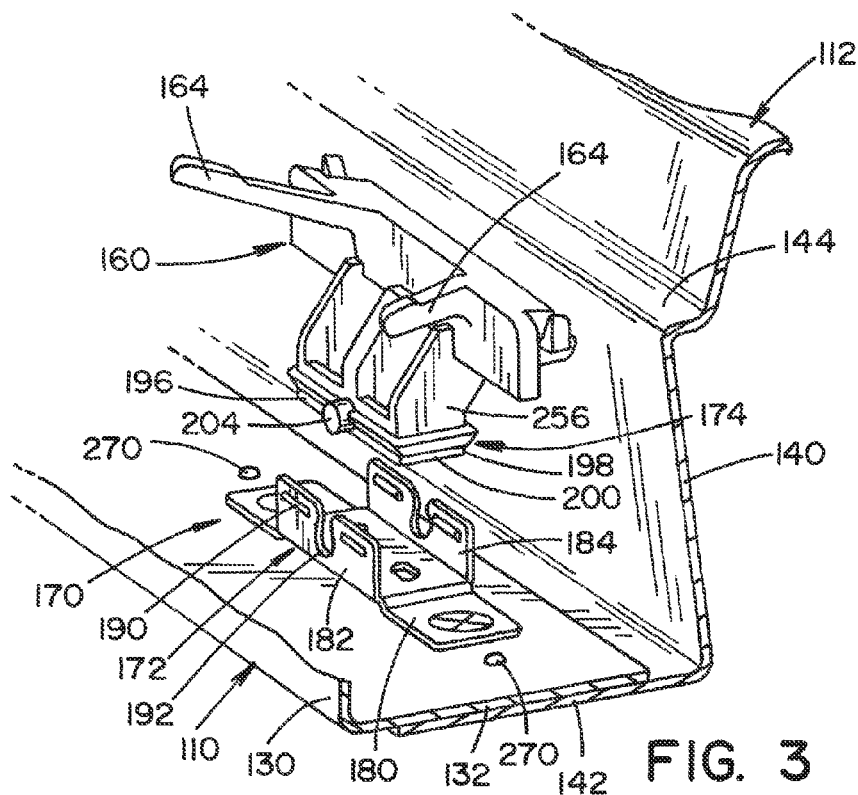
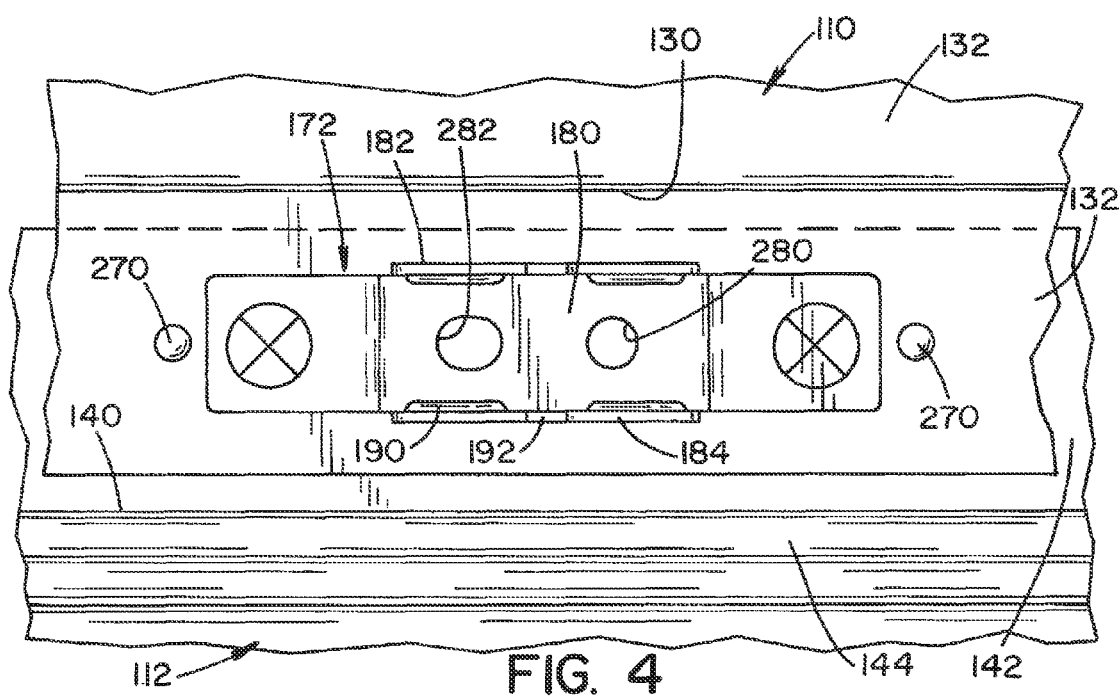

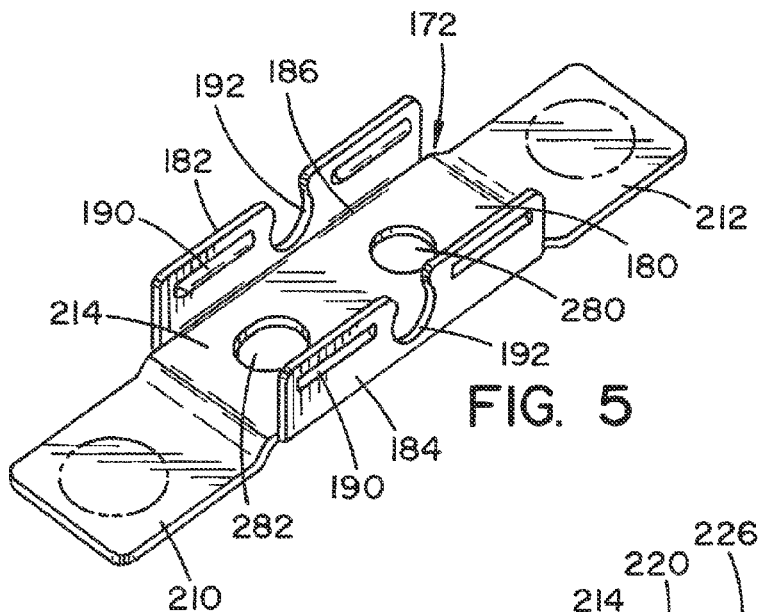
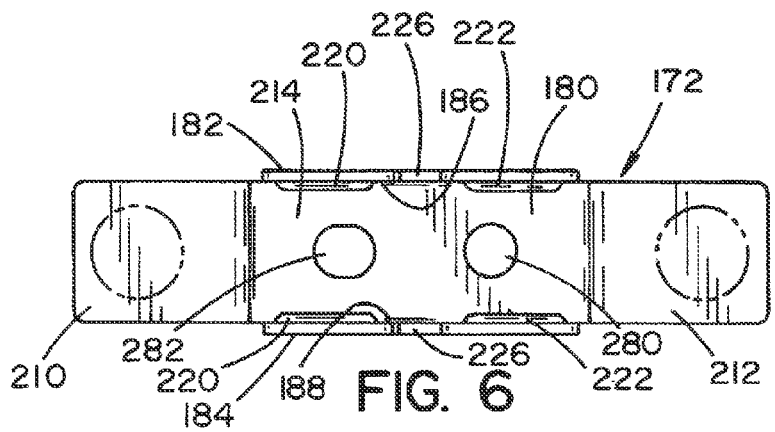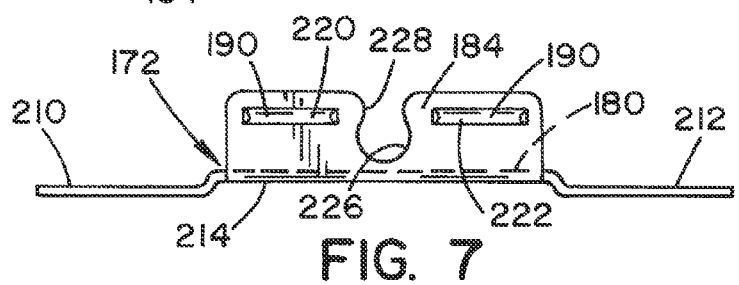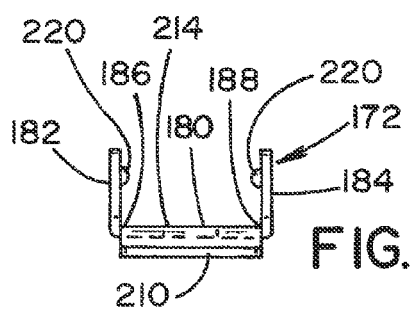

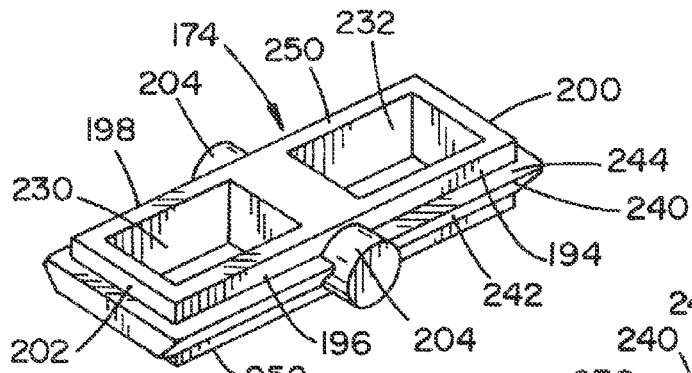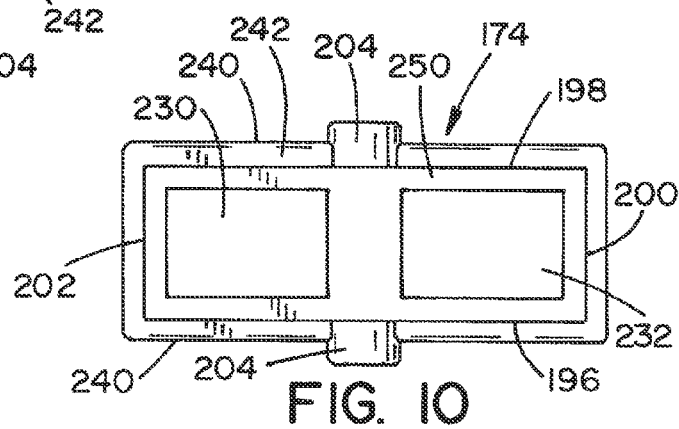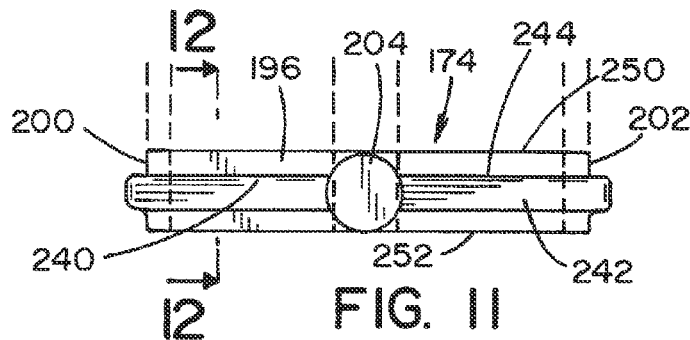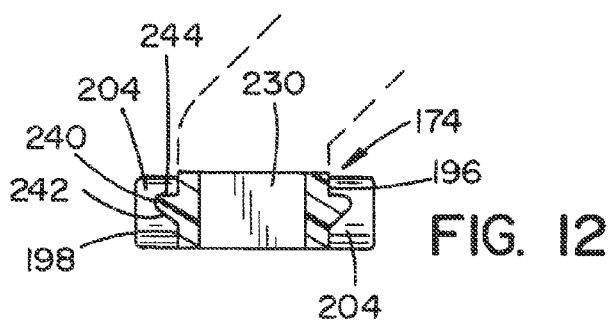

RETAINING CLIP AND BRACKET FOR ROOF MOLDING

BACKGROUND

Vehicles typically include a roof panel and a side body panel that are joined together at the bottom of a flange structure extending along the mating edges of the roof panel and the side body panel. This structure creates a groove or ditch at the juncture between the roof panel and the side panel that extends along the longitudinal direction of the vehicle roof. A roof molding is installed into the roof ditch to provide an aesthetically pleasing appearance and also prevent dirt and foreign matter from residing in the ditch. The roof molding can be retained within the ditch by a series of clips. The molding is inserted into the clips, and the clips can then be secured to studs (e.g., T-shaped studs) provided in spaced relation on a bottom wall of the ditch.

When fixing the roof molding to a predetermined position of a vehicle body panel, an insertion hole of the clip is arranged just above the stud. The roof molding is then inserted into the ditch and a head portion of the T-shaped stud is inserted into the insertion hole of the clip. Then, a forward end portion of the roof molding in the longitudinal direction thereof is pushed toward the bottom wall of the ditch and the roof molding is moved in the longitudinal direction while being pushed. In this way, the head portion of the stud is inserted into the insertion hole of the clip thereby fixing the roof molding within the roof ditch. With this arrangement, both the clip fixed to the lower surface side of the roof molding and the stud fixed on the bottom wall of the ditch cannot be completely viewed by a worker because they are generally hidden by the roof molding (or positioned at a blind spot). Accordingly, the fixing of the roof molding requires much skill and attention. Further, the use of the T-shaped studs can create problems with the attachment of the roof molding within the ditch. For example, there can be a height and/or angle variation between adjacent studs. This can reduce worker efficiency with respect to installation of the roof molding.

BRIEF DESCRIPTION

In accordance with one aspect, a molding fixing assembly for securing a roof molding in a roof groove defined by a vehicle body comprises a bracket fixedly secured in the roof groove and a separate clip mounted to the roof molding. The bracket includes a base and a pair of arms extending substantially perpendicularly from opposed longitudinal side edges of the base. At least one of the arms includes a first retaining member and a second retaining member having a configuration different than the first retaining member. The clip includes a body having a pair of longitudinal sidewalls and a pair of end walls. At least one of the sidewalls has a post projecting therefrom. To connect the clip to the bracket, the sidewalls of the clip are positioned between the pair of arms of the bracket. The first retaining member engages one of the sidewalls of the clip and the second retaining member engages the post.

In accordance with another aspect, a vehicle assembly comprises a vehicle body including a center roof panel and a side roof panel. A connection portion between the center roof panel and the side roof panel forms a roof groove. A molding is configured to be secured at least partially in the roof groove. A bracket is fixedly secured in the roof groove. The bracket includes a base and a pair of arms extending outwardly from opposed longitudinal side edges of the base. At least one of the arms includes a retaining member and a cutout. The base further includes a datum hole and a datum slot spaced from the datum hole which together define a locating feature to ensure accurate positioning of the bracket within the roof groove. A separate clip is mounted to the molding. The clip includes a body having a post projecting therefrom. The body is dimensioned to be received between the pair of arms of the bracket. The retaining member is adapted to engage the body and the cutout is sized to receive the post.

In accordance with yet another aspect, a method of securing a roof molding within a roof groove defined by a vehicle body comprises providing a locating feature on a bracket; positioning the bracket within the roof groove via the locating feature; fixedly securing the bracket in the roof groove, the bracket having a U-shaped, centrally located portion having a first retaining member and a second retaining member; securing a separate clip to a portion of the roof molding, the clip having a body having an outwardly extending ledge and a projection located adjacent the ledge; positioning the clip in the U-shaped portion of the bracket; and releasably engaging the ledge of the clip with the first retaining member and the projection of the clip with the second retaining member.

BRIEF DESCRIPTION OF THE DRAWINGS

FIG. 3 is a perspective view of a portion of the roof groove of FIG. 1 showing the bracket secured to a bottom of the roof groove and the clip mounted to the molding.

FIG. 4 is a top view of the roof groove and bracket of FIG. 3.

FIG. 5 is a perspective view of the bracket of FIG. 3.

FIG. 6 is a top view of the bracket of FIG. 5.

FIG. 7 is a side view of the bracket of FIG. 5.

FIG. 8 is an end view of the bracket of FIG. 5.

FIG. 9 is a perspective view of the molding clip of FIG. 3.

FIG. 10 is a top view of the clip of FIG. 9.

FIG. 11 is a side view of the clip of FIG. 9.

FIG. 12 is a cross-sectional view taken along line 12-12 of the molding clip of FIG. 11.

DETAILED DESCRIPTION

It should, of course, be understood that the description and drawings herein are merely illustrative and that various modifications and changes can be made in the structures disclosed without departing from the present disclosure. In general, the figures of the exemplary molding fixing assembly are not to scale. It should be appreciated that the term "plurality" means "two or more", unless expressly specified otherwise. It will also be appreciated that the various identified components of the exemplary molding fixing assembly disclosed herein are merely terms of art that may vary from one manufacturer to another and should not be deemed to limit the present disclosure.

Figure 1:
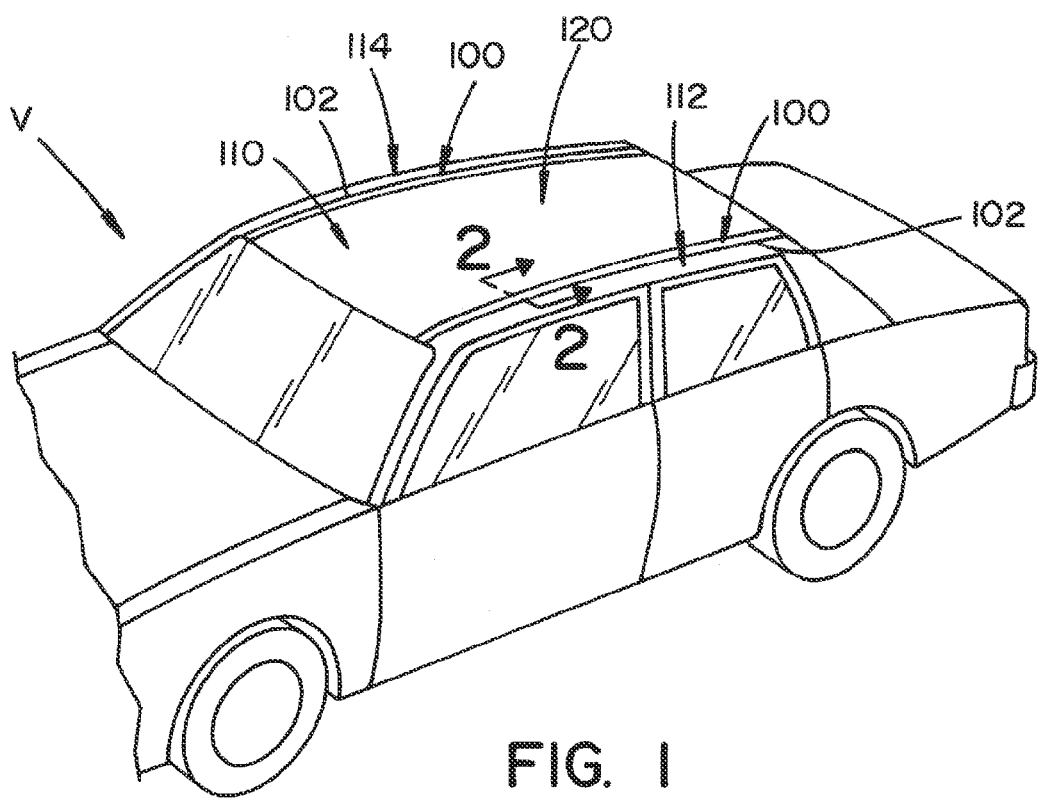
FIG. 1 is a perspective view of a vehicle in which a roof molding of an elongated shape is fixed along a roof groove or ditch provided along a longitudinal direction of the vehicle at a side edge portion of a roof panel of a vehicle body.

Referring now to the drawings, wherein like numerals refer to like parts throughout the several views, FIG. 1 is a perspective view of a vehicle V having a pair of elongated side or roof moldings 100 attached to a pair of roof grooves or ditches 102 defined by a vehicle body and provided along a longitudinal direction of the vehicle. In FIG. 1, end portions in a vehicle width direction of a center roof panel 110 and left and right side panels or frames 112 and 114, which together define a roof 120, are overlapped by a predetermined width and are fixedly connected to each other. Each roof groove 102 is formed at the joined portion along the longitudinal direction of the vehicle and each roof molding 100 is fit into one of the roof grooves 102. The left and right side frames 112, 114 may be identically constructed, but for their disposition on opposite sides of the vehicle V. To simplify the explanation of the present disclosure, only the roof molding 100 connected in the roof groove 102 provided along the left side frame 112 (hereinafter side frame 112) will be discussed in detail, but it should be understood that the same construction could be used for the right side of the vehicle.

Figure 2:
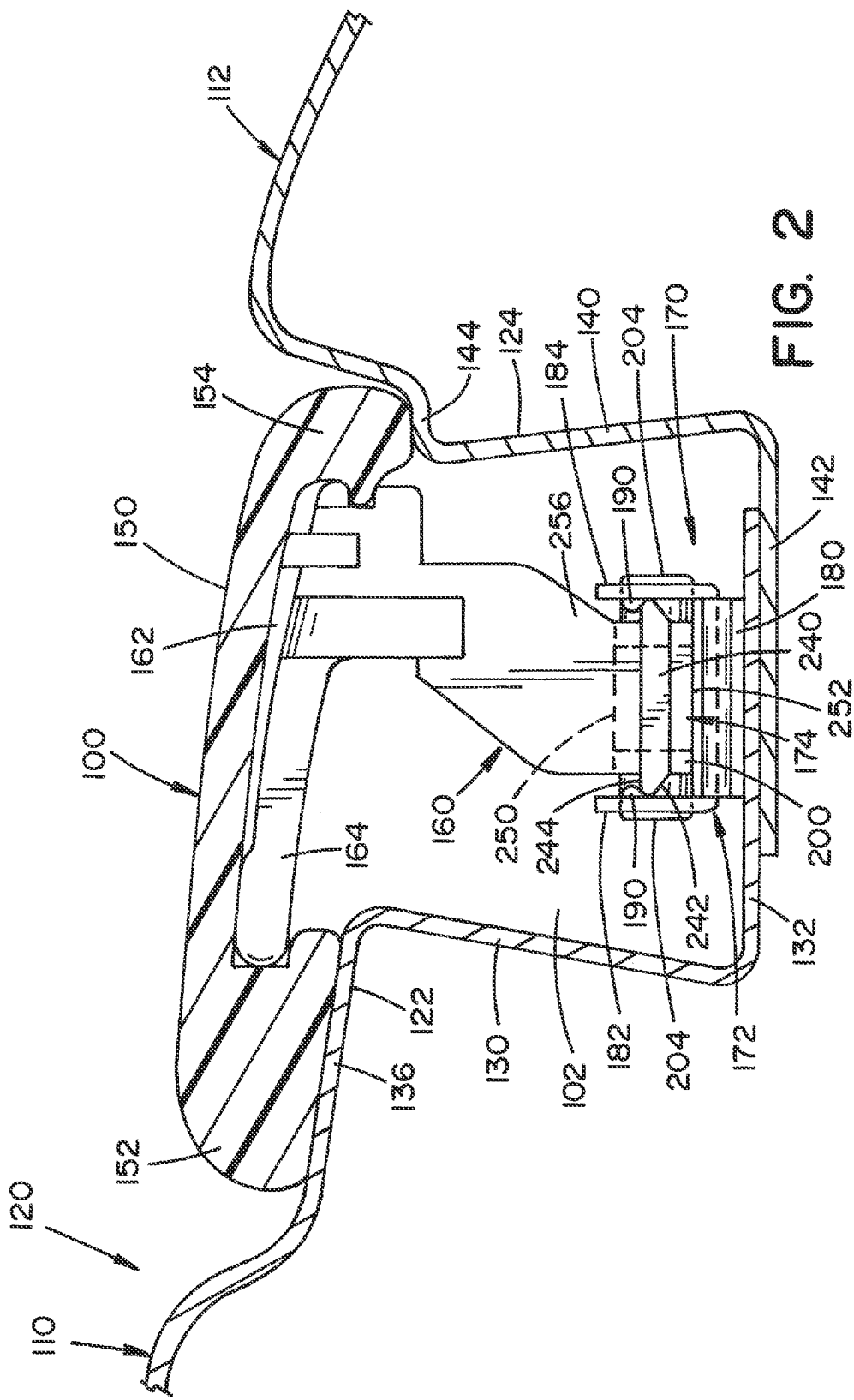
FIG. 2 is a cross-sectional view taken along line 2-2 of FIG. 1 showing a molding fixing assembly including a bracket and a molding clip, according to a configuration of the present disclosure.

As shown in FIG. 2, an end portion 122 of the roof panel 110 and an end portion 124 of the side frame 112 each carry a flange structure that is used to attach the roof panel and side frame together. In particular, and according to one aspect, the roof panel 110 has a flange structure including a vertical wall 130 and a horizontal wall 132. The vertical wall 130 has a shelf 136 that is indented below (in a vehicle height direction) an upper surface of the roof panel 110. The side frame 112 has a flange structure including a vertical wall 140 and a horizontal wall 142. A shelf 144 is provided in the vertical wall 140. The horizontal walls 132 and 142 overlap with one another and can be welded together by a series of electric resistance spot welds, not shown, that are provided along the length of the roof panel 110 and side frame 112. Accordingly, as depicted in FIG. 2, the juncture between the roof panel 110 and body side frame 112 forms the roof groove or ditch 102 that will run the longitudinal length of the vehicle roof 120.

The roof molding 100 can be made of a relatively flexible plastic in an extrusion process. The roof molding 100 is provided to fill the roof groove 102 and can include an ornament portion 150 sized to cover an opening of the roof groove 102. The ornament portion 150 can include a left wing 152 (per the orientation shown in FIG. 2) that extends into overlapping engagement with the shelf 136 of the roof panel 110 and a right wing 154 that extends into overlapping engagement with the shelf 144 of the side frame 112. The molding 100 can also have a plurality of separate attachment members 160 connected to the ornament portion 150 and housed at least partially within the roof groove 102 for securing the molding 100 to the vehicle roof 120. The ornament portion 150 can include an elongated lower channel 162 adapted to receive an upper part 164 of each attachment member 160.

An exemplary molding fixing assembly 170 according to the present disclosure is provided for securing the roof molding 100 in the roof groove 102. With reference to FIGS. 2 and 3, the molding fixing assembly 170 includes a plurality of brackets 172 installed at spaced intervals along the length of the roof groove 102 and a plurality of separate molding or retaining clips 174 mounted to the attachment members 160 provided on the roof molding 100 and connectable to the brackets 172. As shown in FIGS. 5-8, in general, each bracket 172 includes a base 180 and a pair of arms 182, 184 extending substantially perpendicularly from opposed longitudinal side edges 186, 188 of the base. At least one of the arms 180, 182 includes a first retaining member 190 and a second retaining member 192 having a configuration different than the first retaining member. As shown in FIGS. 9-12, in general, the clip 174 includes a rectangular shaped body 194 dimensioned to be received between the pair of bracket arms 182, 184. The body 194 has a pair of opposing longitudinal sidewalls 196, 198 and a pair of opposing end walls 200, 202. At least one of the sidewalls has a projection or post 204 projecting therefrom. To connect the clip 174 to the bracket 172, the sidewalls 196, 198 of the clip are positioned between the pair of arms 182, 184 of the bracket. The first retaining member 190 engages one of the sidewalls 196, 198 of the clip 174 and the second retaining member 192 engages the post 204, which will be described in more detail below.

More particularly, the base 180 of the bracket 172 includes longitudinally spaced end portions 210, 212 and a central portion 214. The end portions 210, 212 are fixedly secured to the vehicle body, for example by welding the end portions to the horizontal wall 132 of the roof panel 110. The central portion 214 can be raised relative to the end portions 210, 212. The pair of arms 182, 184 extends from the central portion 214 and together with the central portion defines a general U-shape. As indicted above, at least one of the arms 182, 184 includes the first retaining member 190 and the second retaining member 192. In the embodiment of the bracket 172 depicted in FIGS. 5-8, each of the arms 180, 182 of the bracket 172 includes the first and second retaining members 190 and 192. The first retaining member 190 can include a pair of inwardly extending tabs 220, 222, meaning that the tabs 220, 220 provided on one of the arms extend toward the other arm. Thus, the exemplary bracket 174 includes the first retaining member defined by the pair of inwardly extending tabs 220, 222 on arm 180 and the pair of inwardly extending tabs 220, 222 on arm 182 which are laterally spaced from the other pair of tabs. The second retaining member 192 is defined by a cutout 226 located in each arm 182, 184. As shown, each cutout 226 is centrally located on each of the arms 182, 184 and is interposed between the pair of tabs 220, 222 provided on that arm; although, this positioning of the cutout on each arm 182, 184 is not required. Each cutout 226 includes a tapered portion 228 that reduces an open area of the cutout, and, as will be described below, the tapered portion 228 secures the post 204 within the cutout.

With reference to FIGS. 9-12, the clip 174 includes a pair of laterally spaced posts 204. Particularly, each of the sidewalls 196, 198 of the clip body 194 includes the post 204 projecting therefrom. Each post 204 is received in one of the cutouts 226 provided in the arms 182, 184 of bracket 172. Each post 204 is dimensioned slightly smaller than the cutouts 226, but larger than the size of the tapered portions 228. The posts 204 are forced through the tapered portions 228, and, as indicated above, the tapered portions 228 secure the posts 204 in the cutouts 226. The clip body 194 further includes a pair of longitudinal spaced openings 230 and 232. The openings reduce the weight of the clip 174 and can facilitate the securing of the clip to the bracket 172. At least one of the sidewalls 196, 198 of the clip body 194 includes a ledge 240 extending outwardly therefrom. The ledge 240 is located adjacent the post 204 and is engaged by one of the first retaining members 190 of the bracket 172. In the depicted embodiment, each of the sidewalls 196, 198 and end walls 200, 202 of the clip body 194 includes the outwardly extending ledge 240. The ledge 240 includes an upwardly and outwardly inclined surface 242 and an upper surface 244. The ledge 240 further separates the clip body 194 into a first (upper) portion 250 and a second (lower) portion 252, one of which can be engaged by the roof molding 100 for securing the clip 174 to the molding. As shown in FIGS. 2 and 3, the first portion 250 is engaged by a lower part 256 of the attachment member 160 of the roof molding 110.

As depicted in FIGS. 3 and 4, the bracket 172 is suitably attached at the bottom of the roof groove 102. To provide for proper placement of the bracket 172 in the roof groove 102, visual points are located on a bottom wall of the roof groove. The visual points can be defined by spaced apart protuberances 270 provided on the horizontal wall 132 of the roof panel 110; although, alternative means for the visual points are contemplated. The bracket 272 is positioned between adjacent protuberances 270. The base 180 of the bracket 172 further includes a datum hole 280 and a datum slot 282 spaced from the datum hole. The datum hole 280 and datum slot 282 together define a locating feature that together with the visual points 270 ensure accurate positioning of the bracket 172 within the roof groove 102. The base 180 can also include a magnet 284 for temporarily holding the bracket 172 in the roof groove 102 as the bracket 172 is being positioned via the locating feature. The pair of spaced openings 230, 232 of the clip 274 is aligned with the locating feature of the bracket 172, which, in turn, aligns the posts 204 with the cutouts 226 of the bracket 172.

The bracket 172 can be of stamped metal construction, and the clip 174 can be made of a plastic material. The bracket arms 182, 184 provide retaining functions by their engagement with the clip 174. To install the clip 174 within the bracket 172, the posts 204 are aligned with the cutouts 226. A downward insertion force applied to the molding 100 causes the clip body 194, specifically the ledge 244, to forcibly spread apart the opposed arms 182, 184 so that the ledge 244 can pass below the tabs 220, 222 provided on each of the arms 182, 184. The inclined surface 242 of the ledge 240 engages with the tabs 220, 222 to allow the ledge 240 to pass beyond the first retaining members 190. The tabs 220, 222 provide a wedge that engages the upper surface 244 of the ledge 240. This downward force also moves the posts 204 below the tapered portions 228 and into the cutouts 226. Upon the full insertion of the roof molding 100, the left wing 152 and right wing 154 of the molding 100 are engaging respectively with the shelf 136 of the roof panel 110 and the shelf 144 of the side frame 112. Accordingly, once the roof molding 100 reaches its fully installed position of FIG. 2, the arms 182, 184 provide a downward, retaining force upon the molding 100, with the posts 204 being retained in the cutouts 226.

The present disclosure further provides an exemplary method of securing the roof molding 100 within the roof groove 102 defined by the vehicle body. The method includes providing a locating feature 280, 282 on the bracket 172; positioning the bracket 172 within the roof groove 102 via the locating feature; fixedly securing the bracket 172 in the roof groove 102; securing the separate clip 174 to a portion of the molding 100; positioning the clip 174 in the U-shaped central portion 214 of the base 180 of the bracket 172; and releasably engaging the ledge 240 of the clip 174 with the first retaining member 190 and the projection 204 of the clip with the second retaining member 192. The engaging step includes positioning the clip body 194 at least partially below the pairs of tabs 220, 222 provided on the arms 182, 184 such that the pairs of tabs engages the upper surface 244 of the ledge 240. The engaging step further includes positioning the clip projections 204 in the bracket cutouts 226. The method further includes the step of providing visual points 270 on the bottom wall of the roof groove 102 for positively locating the bracket 172 and temporarily holding the bracket 172 in the groove as the bracket is being positioned relative to the visual points via the locating feature 280, 282.

Accordingly, as is evident from the foregoing, the exemplary molding fixing assembly 170 includes the roof bracket 172 which is fixedly secured within the roof ditch 102 and the corresponding clip 174 which is connected to the roof molding 100. The roof bracket 172 includes the base 180 and the pair of arms 182, 184 extending from opposed side edges of the base. The base 180 includes the datum hole 280 and datum slot 282 which together define a locating feature to ensure accurate positioning of the roof bracket 172 within the ditch 102. Each arm 180, 182 includes an inwardly extending tab 220, 222 and a cutout 226, which can be centrally located on each arm. The clip 174 includes the base 194 having the pair of sidewalls 196, 198 and the pair of end walls 200, 202, each sidewall and end wall having a ledge extending outwardly therefrom. Further, each sidewall 196, 198 can include the post 204 projecting therefrom. To connect the clip 174 to the bracket 172, the posts 204 are positioned in the cutouts 226 provided on the sidewalls of the bracket. As the clip 174 is pushed downwardly into the bracket 172, the ledges 240 on the sidewalls move past the inwardly extending tabs 220, 222 of the bracket 172 and the posts 204 move downwardly into the cutouts 226. The clip 174 is then prevented from being removed from the bracket by the engagement of the retaining tabs 220, 222 and the corresponding ledges 240.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of securing a roof molding within a roof groove defined by a vehicle body comprising:
providing a locating feature on a bracket;
positioning the bracket within the roof groove via the locating feature;
fixedly securing the bracket in the groove, the bracket having a U-shaped, centrally located portion having a first retaining member and a second retaining member;
securing a separate clip to a portion of the roof molding, the clip having a body having an outwardly extending ledge and a projection located adjacent the ledge;
positioning the clip in the U-shaped portion of the bracket; and
releasably engaging the ledge of the clip with the first retaining member and the projection of the clip with the second retaining member,
wherein the first retaining member is defined by a first pair of inwardly extending tabs and a second pair of inwardly extending tabs which are laterally spaced from the first pair of tabs, and the engaging step includes positioning the clip body at least partially below the first and second pairs of tabs such that the first and second pairs of tabs engage an upper surface of the ledge, and
wherein the second retaining member is defined by a pair of laterally spaced cutouts, each cutout having a tapered portion that reduces an open area of the cutout, and the clip includes a pair of laterally spaced projections, and the engaging step includes positioning the projections in the cutouts.

2. The method of claim 1, further comprising the step of providing visual points on a bottom wall of the roof groove for positively locating the bracket, and temporarily holding the bracket in the groove as the bracket is being positioned relative to the visual points via the locating feature.

* * * * *